(12) United States Patent
Nishisaka et al.

(10) Patent No.: US 10,068,710 B2
(45) Date of Patent: Sep. 4, 2018

(54) LAMINATED CERAMIC ELECTRONIC COMPONENT AND METHOD FOR MANUFACTURING SAME

(71) Applicant: Murata Manufacturing Co., Ltd., Nagaokakyo-shi, Kyoto-fu (JP)

(72) Inventors: Yasuhiro Nishisaka, Nagaokakyo (JP); Masato Kimura, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 15/204,268

(22) Filed: Jul. 7, 2016

(65) Prior Publication Data

US 2017/0018362 A1    Jan. 19, 2017

(30) Foreign Application Priority Data

Jul. 17, 2015 (JP) ................ 2015-143029
May 17, 2016 (JP) ................ 2016-098484

(51) Int. Cl.
*H01G 4/30* (2006.01)
*H01G 4/232* (2006.01)
*H01G 4/12* (2006.01)

(52) U.S. Cl.
CPC .............. *H01G 4/30* (2013.01); *H01G 4/232* (2013.01); *H01G 4/2325* (2013.01); *H01G 4/12* (2013.01)

(58) Field of Classification Search
CPC ........... H01G 4/30; H01G 4/005; H01G 4/12; H01G 4/228; H01G 4/06; H01G 4/012; H01G 4/232; H01G 4/2325
See application file for complete search history.

(56) References Cited

U.S. PATENT DOCUMENTS

| 8,830,651 | B2* | 9/2014 | Yamaguchi | H01B 3/12 |
| | | | | 361/301.2 |
| 2005/0219789 | A1 | 10/2005 | Akimoto et al. | |
| 2009/0279229 | A1 | 11/2009 | Motoki et al. | |
| 2010/0067171 | A1* | 3/2010 | Yamazaki | C04B 35/4682 |
| | | | | 361/321.4 |
| 2011/0122540 | A1* | 5/2011 | Ogawa | H01G 4/2325 |
| | | | | 361/305 |
| 2011/0141657 | A1 | 6/2011 | Jeon et al. | |
| 2012/0007709 | A1* | 1/2012 | Taniguchi | H01G 4/005 |
| | | | | 336/200 |
| 2014/0340816 | A1* | 11/2014 | Takaoka | H01G 2/04 |
| | | | | 361/305 |

(Continued)

FOREIGN PATENT DOCUMENTS

| JP | 2002110444 | * | 4/2002 | ............... H01G 4/12 |
| JP | 2006028571 | * | 2/2006 | ............ H01G 4/232 |

(Continued)

*Primary Examiner* — Nguyen Ha
(74) *Attorney, Agent, or Firm* — Arent Fox LLP (57) ABSTRACT

A laminated ceramic electronic component that includes a laminate having a plurality of dielectric layers and a plurality of internal electrode layers laminated together. External electrodes having underlying electrode layers and plating layers are formed on both end surfaces of the laminate. When a cross-section including the underlying electrode layers is observed, the underlying electrode layers contain a plurality of Cu crystals and glass, and an average value of lengths of demarcation lines of the Cu crystals having different crystal orientations is 3 μm or less.

5 Claims, 3 Drawing Sheets

(56) References Cited

U.S. PATENT DOCUMENTS

2015/0055273 A1 2/2015 Endo et al.
2015/0213959 A1* 7/2015 Omori .................. H01G 4/1227
　　　　　　　　　　　　　　　　　　　　　　361/301.4

FOREIGN PATENT DOCUMENTS

| JP | 2009277715 | A | | 11/2009 | |
|----|------------|---|---|---------|---|
| JP | 2014-154569 | A | | 8/2014 | |
| JP | 2015062216 | A | | 4/2015 | |
| JP | 2016033850 | | * | 3/2016 | ............... H01G 4/30 |
| KR | 20060045129 | A | | 5/2006 | |
| KR | 20110067509 | A | | 6/2011 | |

* cited by examiner

LAMINATED CERAMIC ELECTRONIC COMPONENT AND METHOD FOR MANUFACTURING SAME

CROSS REFERENCE TO RELATED APPLICATIONS

The present application claims priority to Japanese Patent Application No. 2015-143029, filed Jul. 17, 2015, and Japanese Patent Application No. 2016-098484, filed May 17, 2016, the entire contents of each of which are incorporated herein by reference.

BACKGROUND OF THE INVENTION

Field of the Invention

The present invention relates to a laminated ceramic electronic component and a method for producing the same, and particularly to a laminated ceramic electronic component which includes a laminate having a plurality of dielectric layers and a plurality of internal electrode layers respectively laminated and having an external electrode formed on an end surface of the laminate so as to be electrically connected to an internal electrode layer, such as a multilayer ceramic capacitor, and a method for producing the same.

Description of the Related Art

An example of the laminated ceramic electronic component of miniature size is a multilayer ceramic capacitor. The multilayer ceramic capacitor includes a base body in which the dielectric layer and the internal electrode layer are alternately laminated. The internal electrode layer is configured in such a way that a pair of internal electrode layers are alternately exposed to both end surfaces of the base body. One of the internal electrode layers alternately laminated is electrically connected to an inner side of a terminal electrode formed so as to cover one end surface of the base body. In addition, the other of the internal electrode layers alternately laminated is electrically connected to an inner side of a terminal electrode formed so as to cover the other end surface of the base body. In this way, a capacitance is formed between terminal electrodes formed on both ends of the base body (refer to JP 2015-62216 A).

SUMMARY OF THE INVENTION

In recent years, laminated ceramic electronic components have been increasingly downsized. In the case of a ceramic electronic component in which an internal electrode layer within a laminate is electrically connected to an external electrode formed on an end surface of the laminate like a multilayer ceramic capacitor, a contact area between the internal electrode layer and the external electrode is generally decreased as the component is more downsized, and therefore a joining property between the internal electrode layer and the external electrode is deteriorated. Further, a contact area between the external electrode and the laminate is also decreased, and therefore a fixing force between the external electrode and the laminate is reduced.

In view of the above, it is a main object of the present invention to provide a laminated ceramic electronic component in which a joining property between the internal electrode layer within the laminate and the external electrode is high and a strong fixing force between the external electrode and the laminate can be secured.

The laminated ceramic electronic component according to the present invention is preferably a laminate with a cuboid shape.

The laminate has a plurality of dielectric layers and a plurality of internal electrode layers respectively laminated together, and has a first main surface and a second main surface opposed to each other in a lamination direction thereof, a first side surface and a second side surface opposed to each other in a width direction orthogonal to the lamination direction, and a first end surface and a second end surface opposed to each other in a length direction orthogonal to the lamination direction and the width direction.

The laminate preferably has a dimension in the length direction of 0.25 mm or less, a dimension in the lamination direction of 0.125 mm or less, and a dimension in the width direction of 0.125 mm or less.

A first external electrode covers the first end surface and extends from the first end surface so as to cover the first and second main surfaces and the first and second side surfaces. A second external electrode covers the second end surface and extends from the second end surface so as to cover the first and second main surfaces and the first and second side surfaces. A first set of internal electrode layers of the plurality of internal electrode layers are connected to the first external electrode and a second set of internal electrode layers of the plurality of internal electrode layers are connected to the second external electrode.

Each of the first external electrode and the second external electrode include a plating layer and an underlying electrode layer. The underlying electrode layer contains a plurality of Cu crystals and glass when observing its cross-section including the underlying electrode layer with a scanning ion microscope image. The plurality of Cu crystals have different crystal orientations, and an average crystal length of the Cu crystals having different crystal orientations is not less than 0.3 μm and not more than 3 μm.

In the laminated ceramic electronic component according to the present invention, it is preferred that, in a cross-section including the laminate and the first external electrode or the second external electrode, the plurality of Cu crystals and glass are in contact with the laminate at a plurality of locations on an interface between the laminate and the first external electrode or in the confines of the external electrode within 2 μm from an interface between the laminate and the second external electrode, and that the glass is in contact with the laminate at 5 or more locations.

Further, in the laminated ceramic electronic component according to the present invention, the underlying electrode layer preferably contains Al or Zr.

The method for producing a laminated ceramic electronic component according to the present invention includes steps of:

preparing a laminate having a plurality of dielectric layers and a plurality of internal electrode layers respectively laminated, and having a first main surface and a second main surface opposed to each other in a lamination direction, a first side surface and a second side surface opposed to each other in a width direction orthogonal to the lamination direction, and a first end surface and a second end surface opposed to each other in a length direction orthogonal to the lamination direction and the width direction; preparing an electroconductive paste containing Cu particles coated with Al or Zr; and applying the electroconductive paste onto the first end surface and the second end surface of the laminate.

In the laminated ceramic electronic component according to the present invention, it is possible to increase a contact probability between the internal electrode layer whose thickness is reduced within the laminate and the Cu crystal so as to attain good electrical conductivity to the internal electrode layer by setting an average value of a length of a demarcation line of the Cu crystal contained in the underlying electrode layer to be not less than 0.3 μm and not more than 3 μm. Since a plurality of Cu crystals and glass are in contact with the laminate at a plurality of locations on an interface between the laminate and the first external electrode and in the confines of the external electrode within 2 μm from an interface between the laminate and the second external electrode, and the glass is in contact with the laminate at 5 or more locations, the fixing force between the external electrode and the laminate can be enhanced.

According to the present invention, it is possible to attain a laminated ceramic electronic component in which a joining property between the internal electrode layer within the laminate and the external electrode is high and a strong fixing force between the external electrode and the laminate can be secured.

These and other objects, characteristics and advantages of the invention will become more apparent from the following description, which is made in reference to the drawings.

DETAILED DESCRIPTION OF THE INVENTION

Figure 1:
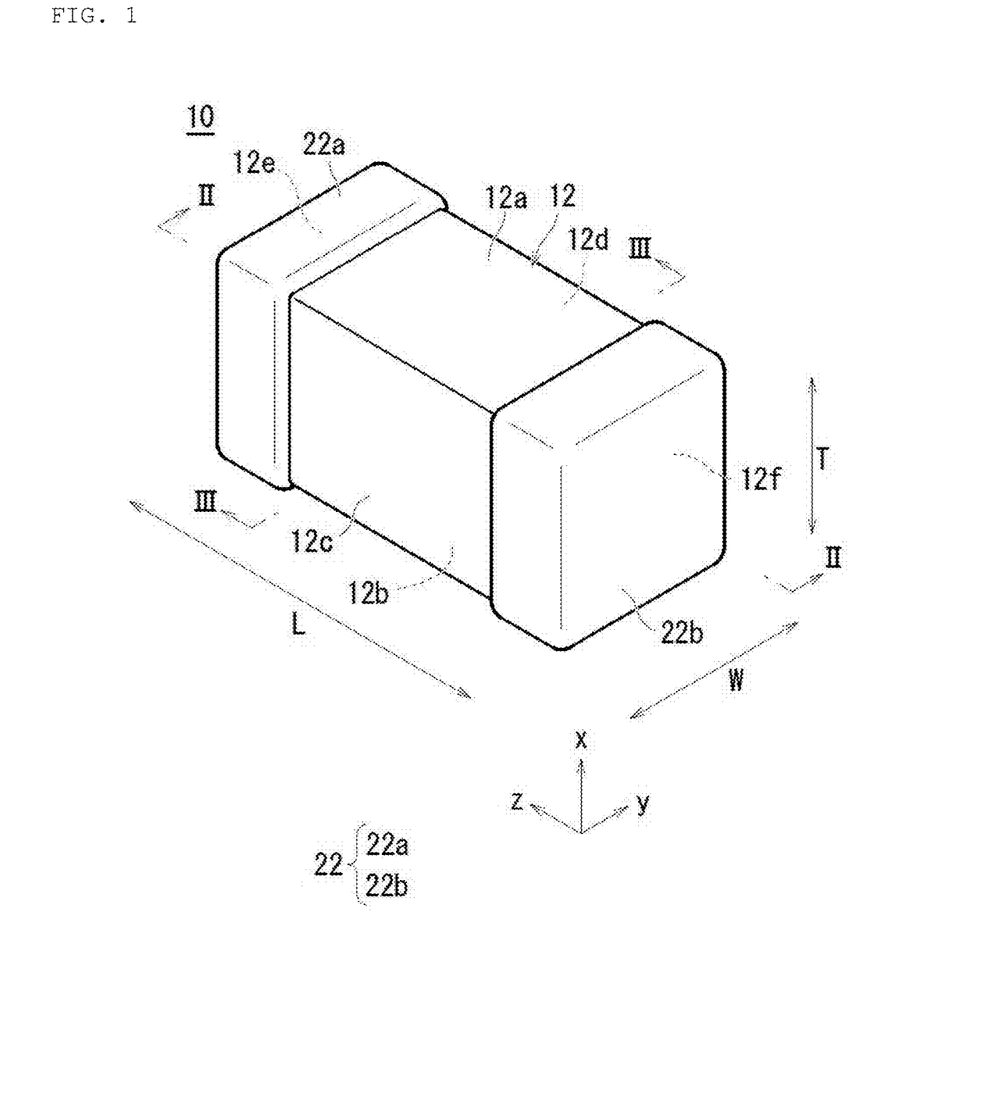
FIG. 1 is a perspective view showing a multilayer ceramic capacitor as an example of a laminated ceramic electronic component of the present invention.
Figure 2:
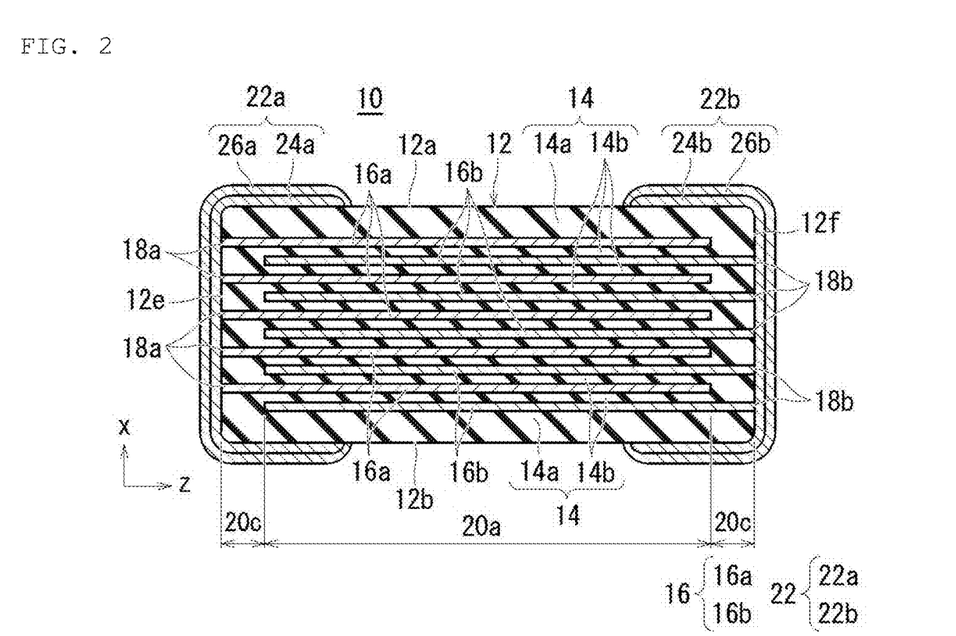
FIG. 2 is a sectional view of the multilayer ceramic capacitor shown in FIG. 1 taken on the line II-II.
Figure 3:
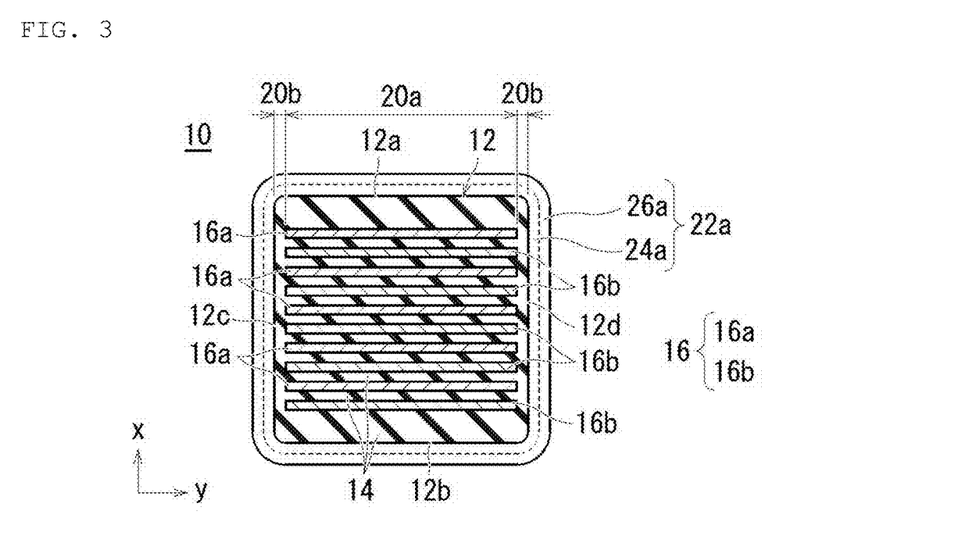
FIG. 3 is a sectional view of the multilayer ceramic capacitor shown in FIG. 1 taken on the line III-III.

As shown in FIG. 1, FIG. 2 and FIG. 3, a multilayer ceramic capacitor 10 as an example of a laminated ceramic electronic component includes, for example, a laminate 12 with a cuboid shape. The laminate 12 has a plurality of dielectric layers 14 and a plurality of internal electrode layers 16 respectively laminated. Moreover, the laminate 12 has a first main surface 12a and a second main surface 12b opposed to each other in a lamination direction x, a first side surface 12c and a second side surface 12d opposed to each other in a width direction y orthogonal to the lamination direction x, and a first end surface 12e and a second end surface 12f opposed to each other in a length direction z orthogonal to the lamination direction x and the width direction y. A corner portion and an edge line portion of the laminate 12 are preferably rounded. Note that the corner portion refers to a portion at which three neighboring planes of the laminate intersect, and the edge line portion refers to a portion at which two neighboring planes of the laminate intersect.

As a dielectric material of the dielectric layer 14 of the laminate 12, for example, a dielectric ceramic containing a component such as $BaTiO_3$, $CaTiO_3$, $SrTiO_3$ or $CaZrO_3$ can be used. Further, a material obtained by adding a compound such as an Mn compound, an Fe compound, a Cr compound, a Co compound or a Ni compound to these components in a range of the content lower than that of a main component may be used. Further, a dimension in the lamination direction x of the dielectric layer 14 is preferably, for example, not less than 0.3 μm and not more than 1.0 μm.

As shown in FIG. 2 and FIG. 3, the dielectric layer 14 includes an outer layer portion 14a and an inner layer portion 14b. The outer layer portions 14a is positioned on the first main surface 12a side and the second main surface 12b side of the laminate 12, is positioned between the first main surface 12a and the internal electrode layer 16 closest to the first main surface 12a, and is positioned between the second main surface 12b and the internal electrode layer 16 closest to the second main surface 12b. A region sandwiched between both outer layer portions 14a is the inner layer portion 14b. Further, a dimension in the lamination direction of the outer layer portion 14a is preferably not less than 15 μm and not more than 20 μm. In addition, the laminate 12 has a dimension in the length direction L that is not less than 0.05 mm and not more than 0.32 mm, a dimension in the width direction W that is not less than 0.025 mm and not more than 0.18 mm, and a dimension in the thickness direction T that is not less than 0.025 mm and not more than 0.240 mm. Target values of the dimensions are 0.25 mm or less for the dimension in the length direction L, 0.125 mm or less for the dimension in the width direction W, and 0.125 mm or less for the dimension in the thickness direction T. The dimensions of the laminate can be measured with a microscope.

As shown in FIG. 2 and FIG. 3, the laminate 12 has, for example, a plurality of first internal electrode layers 16a and a plurality of second internal electrode layers 16b respectively having a substantially rectangular shape, as the plurality of internal electrode layers 16. The plurality of first internal electrode layers 16a and the plurality of second internal electrode layers 16b are buried so as to be alternately arranged at regular intervals along the lamination direction x of the laminate 12.

The laminate 12 has a lead-out electrode portion 18a led out to the first end surface 12e of the laminate 12 on one end of the first internal electrode layer 16a. The laminate 12 has a lead-out electrode portion 18b led out to the second end surface 12f of the laminate 12 on one end of the second internal electrode layer 16b. Specifically, the lead-out electrode portion 18a on the one end side of the first internal electrode layer 16a is exposed to the first end surface 12e of the laminate 12. Further, the lead-out electrode portion 18b on the one end side of the second internal electrode layer 16b is exposed to the second end surface 12f of the laminate 12.

The laminate 12 includes a counter electrode portion 20a in which the first internal electrode layer 16a and the second internal electrode layer 16b are opposed to each other in the inner layer portion 14b of the dielectric layer 14. Further, the laminate 12 includes a side portion 20b of the laminate 12 (hereinafter, referred to as a "W gap") formed between one end in the width direction W of the counter electrode portion 20a and the first side surface 12c and between the other end in the width direction W of the counter electrode portion 20a and the second side surface 12d. Moreover, the laminate 12 includes an end 20c of the laminate 12 (hereinafter, referred to as a "L gap") formed between an end opposite to the lead-out electrode portion 18a of the first internal electrode layer 16a and the second end surface 12f and between an end opposite to the lead-out electrode portion 18b of the second internal electrode layer 16b and the first end surface 12e.

Herein, a length of the L gap 20c of the end of the laminate 12 is preferably not less than 20 μm and not more than 40 μm. Further, a length of the W gap 20b of the side portion of the laminate 12 is preferably not less than 15 μm and not more than 20 μm.

The internal electrode layer 16 contains a metal such as Ni, Cu, Ag, Pd, Ag—Pd alloy, and Au. The internal electrode layer 16 may further contain dielectric particles having the same composition as that of ceramics contained in the dielectric layer 14. The number of the internal electrode layers 16 is preferably 50 or less. The thickness of the internal electrode layers 16 is preferably not less than 1.2 μm and not more than 0.3 μm.

External electrodes 22 are formed on the first end surface 12e side and the second end surface 12f side of the laminate 12. Each of the external electrode 22 has a first external electrode 22a and a second external electrode 22b.

The first external electrode 22a is formed on the first end surface 12e side of the laminate 12. The first external electrode 22a covers the first end surface 12e of the laminate 12, extends from the first end surface 12e, and formed so as to partially cover the first main surface 12a, the second main surface 12b, the first side surface 12c and the second side surface 12d. In this case, the first external electrode 22a is electrically connected to the lead-out electrode portion 18a of the first internal electrode layer 16a.

The second external electrode 22b is formed on the second end surface 12f side of the laminate 12. The second external electrode 22b covers the second end surface 12f of the laminate 12, extends from the second end surface 12f, and formed so as to partially cover the first main surface 12a, the second main surface 12b, the first side surface 12c and the second side surface 12d. In this case, the second external electrode 22b is electrically connected to a lead-out electrode portion 18b of the second internal electrode layer 16b.

In the laminate 12, the first internal electrode layer 16a and the second internal electrode layer 16b are opposed to each other with the dielectric layer 14 interposed therebetween in each counter electrode portion 20a, and thereby a capacitance is formed. Therefore, the capacitance can be obtained between the first external electrode 22a to which the first internal electrode layer 16a is connected and the second external electrode 22b to which the second internal electrode layer 16b is connected. Accordingly, a laminated ceramic electronic component having such a structure functions as a capacitor.

Figure 4:
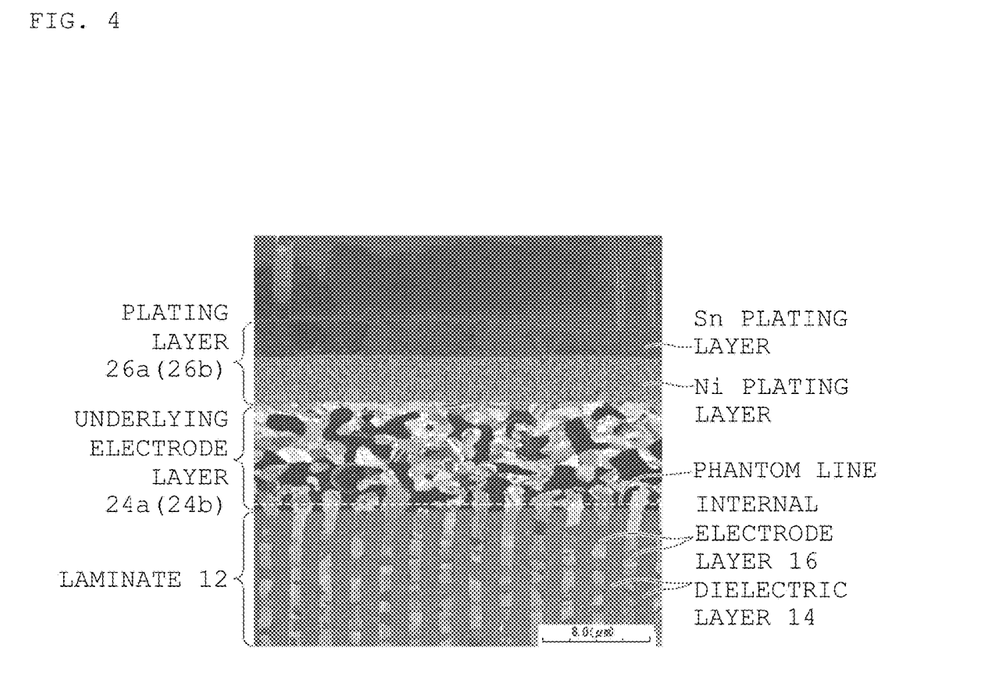
FIG. 4 shows an electron micrograph image of a cross-section of an example of a multilayer ceramic capacitor of the present invention.

As shown in FIG. 4, the first external electrode 22a includes an underlying electrode layer 24a and a plating layer 26a arranged in this order from a laminate 12 side. Similarly, the second external electrode 22b includes an underlying electrode layer 24b and a plating layer 26b arranged in this order from a laminate 12 side.

While each of the underlying electrode layers 24a and 24b includes at least one selected from among a baking layer, a resin layer, and a thin film layer, the underlying electrode layers 24a and 24b comprising the baking layer will be described herein as the present invention pertains to the baking layer.

The baking layer includes glass containing Si, and Cu as a metal. The baking layer is formed by applying an electroconductive paste including glass and metal onto the laminate 12 and baking the paste, and the paste is baked after forming the dielectric layer 14 and the internal electrode layer 16 by firing. A thickness of the thickest portion of the baking layer is preferably not less than 5 μm and not more than 25 μm.

A resin layer containing electroconductive particles and a thermosetting resin may be formed on the baking layer. A thickness of the thickest portion of the resin layer is preferably not less than 5 μm and not more than 25 μm. Further, as the plating layers 26a and 26b, for example, at least one selected from among Cu, Ni, Sn, Ag, Pd, Ag—Pd alloy, Au and the like is used.

The plating layers 26a and 26b may be formed of a plurality of layers. The plating layers 26a and 26b preferably have a two-layer structure of a Ni-plating layer formed on the baking layer and a Sn-plating layer formed on the Ni-plating layer. The Ni-plating layer is used for preventing the underlying electrode layers 24a and 24b from being eroded by solder while mounting the laminated ceramic electronic component, and the Sn-plating layer is used for improving wettability of solder while mounting the laminated ceramic electronic component to enable easy mounting.

The thickness per the plating layer is preferably not less than 1 μm and not more than 8 μm.

In addition, the laminate 12 has a dimension in the length direction L that is not less than 0.18 mm and not more than 0.32 mm, a dimension in the width direction W that is not less than 0.09 mm and not more than 0.18 mm, and a dimension in the thickness direction T that is not less than 0.09 mm and not more than 0.240 mm. In addition, target values of the dimensions are 0.25 mm or less for the dimension in the length direction L, 0.125 mm or less for the dimension in the width direction W, and 0.125 mm or less for the dimension in the thickness direction T. The dimensions of the laminate can be measured with a micrometer.

Further, an average thickness of each of the above-mentioned plurality of conductive material layers and plurality of dielectric layers is measured as follows. First, a multilayer ceramic capacitor 10 is polished so that a cross-section including the length direction L and the thickness direction T of the laminate (hereinafter, referred to as a "LT cross-section") is exposed. By observing the LT cross-section with a scanning electron microscope, a thickness of each portion is measured. In this case, thicknesses on total 5 lines, namely, a center line passing through a center of the cross-section of the laminate 12 in a thickness direction T and 4 lines drawn from the center line toward both sides, are measured. An average value of these 5 measurements is an average thickness of each portion. In order to obtain a more accurate average thickness, the above-mentioned 5 measurements are determined for each of an upper portion, an intermediate portion and a lower portion in the thickness direction T, and an average value of these measurements is considered as an average thickness of each portion.

Next, a production process of the multilayer ceramic capacitor 10 will be described. First, a dielectric sheet and an electroconductive paste for an internal electrode are prepared. The dielectric sheet and the electroconductive paste for an internal electrode include a binder and a solvent. The types of organic binders and organic solvents that can be used are well known and not limited.

The electroconductive paste for an internal electrode is applied on the dielectric sheet in a predetermined pattern by, for example, screen printing or gravure printing, and thereby an internal electrode pattern is formed.

Moreover, a predetermined number of dielectric sheets for an outer layer in which the internal electrode pattern is not formed are laminated, dielectric sheets in which the internal electrode pattern is formed are laminated in turn thereon, and a predetermined number of dielectric sheets for an outer layer are laminated thereon, thereby producing a laminated sheet.

By pressing the obtained laminated sheet in the lamination direction by means such as isostatic press, a laminated block is prepared.

Next, the laminated block is cut to a predetermined size and a laminated chip is cut out. In this process, a corner portion and an edge line portion of the laminated chip may be rounded by barrel polishing or the like.

Moreover, by firing the laminated chip, a laminate is prepared. A firing temperature at this time is, depending on the materials of the dielectric body and the internal electrode, preferably not lower than 900° C. and not higher than 1300° C.

The electroconductive paste for an external electrode is applied onto both end surfaces of the obtained laminate 12, and is baked to form a baking layer of the external electrode. A baking temperature in this process is preferably not lower than 700° C. and not higher than 900° C.

The electroconductive paste for an external electrode includes a Cu powder, and the Cu powder is formed by a liquid phase reduction method. A size of the Cu powder is defined by the condition that a Cu powder distributed in a particle size range of 0.2 μm to 2 μm makes up 50% of the whole Cu powder. The Cu powder preferably contains an Al oxide and is coated with an oxide of Zr or the like.

In baking the electroconductive paste, electrical connection between the internal electrode layer 16 and the external electrode 22 is achieved by contact between the internal electrode layer 16 of the laminate 12 and the Cu crystal in the external electrode. Therefore, in order to easily bringing the lead-out electrode portions 18a and 18b of the internal electrode layer into contact with the Cu crystal in the external electrode 22, a smaller Cu crystal in the external electrode 22 is advantageous.

In order to reduce a grain size of the Cu crystal in the external electrode 22, a slower sintering rate of the electroconductive paste for an external electrode is preferred. Therefore, an oxide is preferably scattered around of the Cu powder within the electroconductive paste or on the inner side of the Cu powder. Examples of such an oxide include oxides of Zr, Al, Ti, and Si, and particularly oxides of Zr and Al are preferred.

Moreover, as required, the surface of the baking layer of the electroconductive paste for an external electrode is plated. Note that, Zr and Al contained in the external electrode can be detected by Dynamic-SIMS. Zr is present at a crystal interface between Cu crystals and at an interface between the Cu crystal and glass. The presence of Zr enables to decrease the sintering rate and facilitates matching of softening behaviors of Cu and glass with each other.

With respect to the multilayer ceramic capacitor 10 thus obtained, the Cu crystal in the external electrode 22 can be observed as follows.

First, the multilayer ceramic capacitor 10 is polished so as to expose the LT cross-section including the external electrode 22. Here, metal sag is preferably removed in order to avoid causing metal sag of the external electrode 22 due to polishing. Then, a cross-section including the underlying electrode layers 24a and 24b is cut out as a thin piece by focused ion beam (hereinafter, abbreviated to FIB), and the thin piece is imaged by a scanning ion electron microscope (hereinafter, abbreviated to SIM).

A Cu crystal having a different crystal orientation, among crystals of Cu, looks different on the SIM. When a contrast looks all the same, the contrast is adjusted. A phantom line of 30 μm in length is drawn substantially parallel to the end surface of the laminate 12, and the length of the phantom line is divided by the number of crystals overlapping the phantom line to calculate a crystal length. Next, crystal lengths of SIM images of three locations are calculated, and an average value thereof is defined as an average crystal length. In the multilayer ceramic capacitor 10, by setting an average crystal length of the Cu crystal to 3 μm or less, the contact property between the internal electrode layer 16 and the external electrode 22 can be improved, and a conductive property between the internal electrode and the external electrode can be improved.

Further, a phantom line of 30 μm in length is drawn in substantially parallel to the end surface in a confine within 2 μm from the first end surface 12e and the second end surface 12f of the laminate 12, and the number of pieces of glass present on the straight line is counted, and thereby how many pieces of glass contained in the underlying electrode layers 24a and 24b are in contact with the laminate 12 is found. When the number of the pieces of glass is 5 or more, the fixing force between the underlying electrode layers 24a and 24b and the laminate 12 is increased. However, even when the number of the pieces of glass is 5 or more and the fixing force is strong, the joining property between the external electrode 22 and the internal electrode layer 16 is deteriorated when the number of Cu crystals is less than 5. Accordingly, when both 5 or more pieces of glass and 5 or more Cu crystals are present, a good fixing force can be secured while improving the connectivity of the external electrode to the internal electrode layer. Preferably, the maximum number of glasses allowed and the maximum number of Cu crystals allowed are respectively 15.

Such effects will become apparent from the following examples.

Experiment Example 1

A multilayer ceramic capacitor was prepared using the above-mentioned production method. Here, 30 multilayer ceramic capacitors were prepared in each of 4 patterns of a targeted average length of the Cu crystal contained in the external electrode, where the target length were not less than 0.3 μm and not more than 3 μm, and they were designated as Example 1 to Example 4. Further, 30 multilayer ceramic capacitors were prepared in each of two patterns, more specifically, a pattern where a targeted average length of the Cu crystal contained in the external electrode was 5 μm and a pattern where a targeted average length of the Cu crystal contained in the external electrode was 0.1 μm, and they were designated as Comparative Example 1 and Comparative Example 2. In the evaluation of the connectivity of the external electrode to the internal electrode layer, a capacitance of each of 30 multilayer ceramic capacitors was measured, a CV value of the capacitance was calculated, the multilayer ceramic capacitor having the CV value of 5% or more was rated as NG (no good), and the multilayer ceramic capacitor having the CV value less than 5% was rated as G (good). Similarly, 100 multilayer ceramic capacitors were prepared in each of 4 patterns of a target average length of the Cu crystal contained in the external electrode, where the target length was not less than 0.3 μm and not more than 3 μm, and they were designated as Example 1 to Example 4. Further, 100 multilayer ceramic capacitors were prepared in each of two patterns, more specifically, a pattern where a target average length of the Cu crystal contained in the external electrode was 5 μm and a pattern where a target average length of the Cu crystal contained in the external electrode was 0.1 μm, and they were designated as Comparative Example 1 and Comparative Example 2. Similarly, as an evaluation of a defect within the external electrode, an appearance inspection of the external electrode was performed, and the capacitor in which bubble-like swelling was generated on the surface of the external electrode was rated as NG since degreasing of the external electrode was insufficient and there is a defect within the external electrode. The capacitor in which bubble-like swelling was not found on the surface of the external electrode was rated as G since there is not a defect. The results of the evaluation are shown in Table 1. When the average length of the Cu crystal is reduced to 0.1 μm, the number of Cu crystals in the external electrode is too large, a degreasing property is deteriorated to cause a structural defect in the external electrode. Accordingly, the connectivity of the external electrode to the internal electrode layer could not be evaluated.

TABLE 1

|  | Comparative Example 1 | Example 1 | Example 2 | Example 3 | Example 4 | Comparative Example 2 |
|---|---|---|---|---|---|---|
| Average Length of Cu Crystal (μm) | 0.1 | 0.3 | 0.8 | 1.5 | 3 | 5 |
| Presence or Absence of Bubble-like Swelling | NG | G | G | G | G | G |
| Connectivity to Internal Electrode Layer | — | G | G | G | G | NG |

Experiment Example 2

Multilayer ceramic capacitors were prepared using the above-mentioned production method, and other evaluations were performed. Here, multilayer ceramic capacitors were prepared in a pattern where a targeted number of pieces of glass being contained in the external electrode and being in contact with the laminate as well as a targeted number of Cu crystals being contained in the external electrode and being in contact with the laminate are 5 or more, and multilayer ceramic capacitors were prepared in a pattern where the number of pieces of glass and the number of Cu crystals are less than 5. After the preparation, the connectivity of the external electrode to the internal electrode layer, and the fixing force between the laminate and the external electrode were evaluated. The evaluation of the connectivity of the external electrode to the internal electrode layer is similar to that of Experiment Example. The fixing force of the laminate to the external electrode was evaluated as follows. A solder called SAC 305 (trade name) manufactured by SENJU METAL INDUSTRY CO., LTD. was applied on a substrate in a thickness of 20 μm. Then, a multilayer ceramic capacitor was mounted on the substrate by soldering, and a lateral push test in which the multilayer ceramic capacitor was laterally pushed in a direction parallel to the substrate was implemented. A force of lateral push was increased stepwise from 0 N to 0.5 N, and if delamination between the laminate and the external electrode is observed in even a single one of ten multilayer ceramic capacitors, the multilayer ceramic capacitors were rated as NG. The results of the evaluation are shown in Table 2. Note that the multilayer ceramic capacitor in which only the laminate was cracked by the lateral push test and the external electrode was fixed to the laminate was rated as G.

TABLE 2

|  | Comparative Example 1 | Comparative Example 2 | Comparative Example 3 | Example 1 | Example 2 | Example 3 |
|---|---|---|---|---|---|---|
| Number of Pieces of Glass | 2 | 6 | 3 | 5 | 10 | 15 |
| Number of Cu Crystals | 6 | 2 | 3 | 5 | 10 | 15 |
| Connectivity to Internal Electrode Layer | G | NG | NG | G | G | G |
| Fixing Force | NG | G | NG | G | G | G |

What is claimed is:

1. A laminated ceramic electronic component comprising:
a laminate having a plurality of dielectric layers and a plurality of internal electrode layers respectively laminated, and having a first main surface and a second main surface opposed to each other in a lamination direction, a first side surface and a second side surface opposed to each other in a width direction orthogonal to the lamination direction, and a first end surface and a second end surface opposed to each other in a length direction orthogonal to the lamination direction and the width direction;
a first external electrode covering the first end surface and extending from the first end surface onto the first and second main surfaces and the first and second side surfaces, the first external electrode being connected to a first set of internal electrodes of the plurality of internal electrodes; and
a second external electrode covering the second end surface and extending from the second end surface onto the first and second main surfaces and the first and second side surfaces, the second external electrode being connected to a second set of internal electrodes of the plurality of internal electrodes,
each of the first external electrode and the second external electrode including a plating layer and an underlying electrode layer, the underlying electrode layer containing a plurality of Cu crystals and glass, the plurality of Cu crystals having different crystal orientations, and an average crystal length of the Cu crystals having different crystal orientations is between 0.3 μm and 3 μm.

2. The laminated ceramic electronic component according to claim 1, wherein the laminate has a dimension in the length direction of 0.25 mm or less, a dimension in the lamination direction of 0.125 mm or less and a dimension in the width direction of 0.125 mm or less.

3. The laminated ceramic electronic component according to claim 1, wherein, in a cross-section including the laminate and the first external electrode or the second external electrode, the plurality of Cu crystals and the glass are each in contact with the laminate at 5 or more locations at an interface between the laminate and the first external electrode or the second external electrode within 2 μm from the interface between the laminate and the first external electrode or the second external electrode.

4. The laminated ceramic electronic component according to claim 3, wherein, the plurality of Cu crystals and the glass are in contact with the laminate at no more than 15 locations at the interface between the laminate and the first external electrode or the second external electrode within the 2 μm from the interface between the laminate and the first external electrode or the second external electrode.

5. The laminated ceramic electronic component according to claim 1, wherein the underlying electrode layer contains Al or Zr.

* * * * *